United States Patent
Shaw

(10) Patent No.: US 8,892,144 B2
(45) Date of Patent: Nov. 18, 2014

(54) DYNAMIC BEARER MANAGEMENT

(75) Inventor: Venson M. Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 465 days.

(21) Appl. No.: 13/281,084

(22) Filed: Oct. 25, 2011

(65) Prior Publication Data

US 2013/0102343 A1    Apr. 25, 2013

(51) Int. Cl.
*H04B 7/00*    (2006.01)
*H04L 12/923*    (2013.01)
*H04L 12/28*    (2006.01)
*H04L 12/26*    (2006.01)
*H04W 8/04*    (2009.01)

(52) U.S. Cl.
CPC .............. *H04L 47/762* (2013.01); *H04L 12/28* (2013.01); *H04L 12/26* (2013.01); *H04W 8/04* (2013.01)
USPC ........ 455/509; 455/507; 455/67.11; 455/433; 455/445; 455/450; 370/310; 370/254; 370/328; 370/329; 370/343

(58) Field of Classification Search
CPC ................................ H04L 12/28; H04L 12/26
USPC .............. 455/509, 507, 500, 517, 512, 67.11, 455/514, 515, 422.1, 403, 433, 432.1, 455/432.2, 445, 450–453, 426.1, 426.2; 370/310, 254, 328, 329, 338, 343, 468
See application file for complete search history.

(56) References Cited

U.S. PATENT DOCUMENTS

2006/0067270 A1* 3/2006 Gilliland et al. .............. 370/329
2012/0155324 A1* 6/2012 Janakiraman et al. ........ 370/254
2012/0218892 A1* 8/2012 Kotecha et al. ............... 370/235

* cited by examiner

*Primary Examiner* — Keith Ferguson
(74) *Attorney, Agent, or Firm* — Baker & Hostetler LLP

(57) ABSTRACT

An MME may request QoS and/or APN parameters from an HSS that may determine whether the MME is approaching or exceeds a threshold number of requested or supportable bearers. The HSS may adjust the QoS/APN parameters based on the threshold determination. The number of bearer requests or established bearers and the total number of supportable bearers may be calculated by the HSS or provided by the MME. The HSS may also take into account the status of other MMEs in the network in adjusting QoS/APN parameters. Upon detecting heavy signaling traffic from a UE, an HSS may take steps, or instruct a policy manager, to reduce or prevent traffic from the UE.

19 Claims, 12 Drawing Sheets

DYNAMIC BEARER MANAGEMENT

TECHNICAL FIELD

The technical field generally relates to wireless communications and more specifically relates to dynamic bearer management.

BACKGROUND

In current wireless networks, such as long term evolution (LTE) networks, a wireless mobile device may request service from a wireless network by transmitting a service request to the wireless network. The request may be provided to a home location register (HLR) or home subscriber server (HSS) that then determines the quality of service (QoS) and/or access point name (APN) parameters to be used in establishing a bearer for the mobile device. The QoS and APN parameters are static so that the mobile device receives the same type and quality of service regardless of network conditions and the area of network to which the mobile device is requesting connection. Because the QoS and APN parameters cannot be dynamically adjusted, the network lacks any means to address the continuously changing conditions on the network and across subsections of the network when establishing bearer paths. Thus, a user of the mobile device may be adversely affected by network conditions such as outages and heavy congestion because the mobile device is limited to using a single predetermined bearer configuration regardless of current network conditions or varying user needs.

Also in current wireless networks, signaling traffic may be segregated from user traffic. However, many of the same network resources may be used by both types of traffic. Therefore, when the network is adversely affected by either signaling traffic or user data traffic, for example by general traffic congestion or malicious activity such as denial of service (DoS) attacks, the other type of traffic may also be adversely affected. Currently there is no way to identify individual mobile devices or sets of mobile devices that may be causing the adverse conditions by transmitting disruptive signaling to the network.

SUMMARY

Systems, methods, and devices are disclosed for dynamically adjusting QoS and/or APN parameters that may be provided to a mobility management entity (MME) for provisioning a bearer for a mobile device on a wireless network. In an embodiment, a network device, such as an HSS or HLR, may receive a request for QoS/APN parameters, for example from an MME. The HSS may determine the number of bearer requests that the MME has received or the number established bearers that the MME is supporting, and determine the relationship of this number of bearers/bearer requests to a threshold. If the number of bearers/bearer requests is well below the threshold, the HSS may not adjust the QoS/APN parameters. If the number of bearers/bearer requests is approaching the threshold, the HSS may lower the bandwidth and other QoS/APN parameters, while if the number of bearers/bearer requests is at or above the threshold, the HSS may lower even more the bandwidth and other QoS/APN parameters. Instead of making the determination itself, the HSS may receive from an MME a total number and/or a percentage of bearers established or bearer requests received. The HSS may also receive threshold data from the MME. The HSS may also take into account more data regarding more than one MME in determining QoS/APN adjustments.

In an embodiment, an HSS may be configured to determine one or more mobile devices that are transmitting a disruptive amount of signaling traffic on the network. The MME may take steps to mitigate this excessive traffic, such as instructing the mobile device to reduce or discontinue transmitting signaling traffic. If the mobile device persists in transmitting disruptive signaling traffic, the HSS may have the mobile device disconnected from the network and added to a list of disruptive devices for further follow-up by customer service. The HSS may also instruct a policy manager to address the disruptive mobile device that may throttle the traffic received from the mobile device. These and other aspects of the present disclosure are described in more detail herein.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Figure 1A:
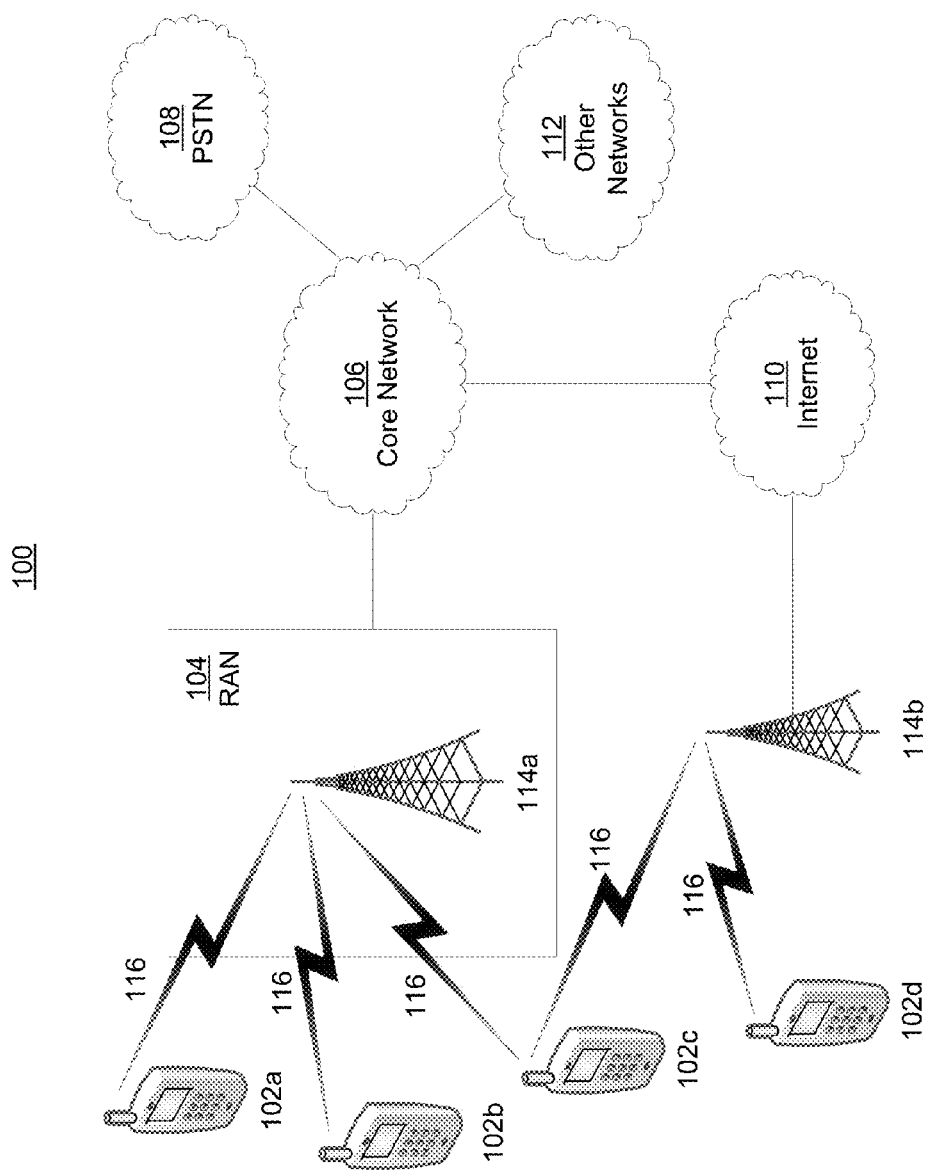
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. A communications system such as that shown in FIG. 1A may also be referred to herein as a network.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a mobile device, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA) that may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA20001x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
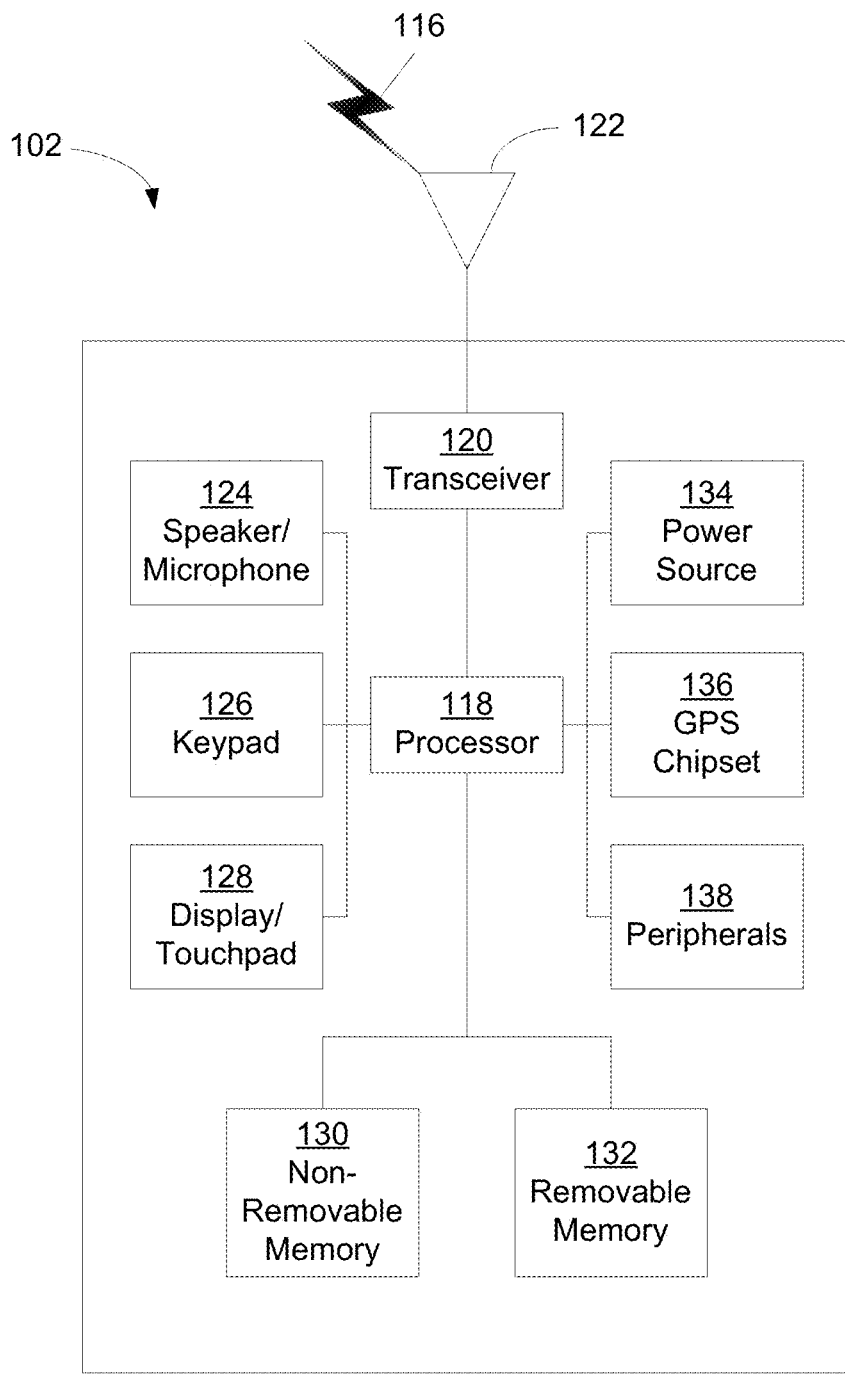
FIG. 1B is a system diagram of an example mobile device (also referred to as a wireless transmit/receive unit (WTRU) and/or as user equipment (UE)) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. Processor 118 may include circuitry and other components that enable processor 118 to perform any of the functions and methods described herein. Such circuitry and other components may also enable processor 118 to communicate and/or interact with other devices and components, for example any other component of device of WTRU 102, in such a manner as to enable processor 118 and such other devices and/or components to perform any of the disclosed functions and methods. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
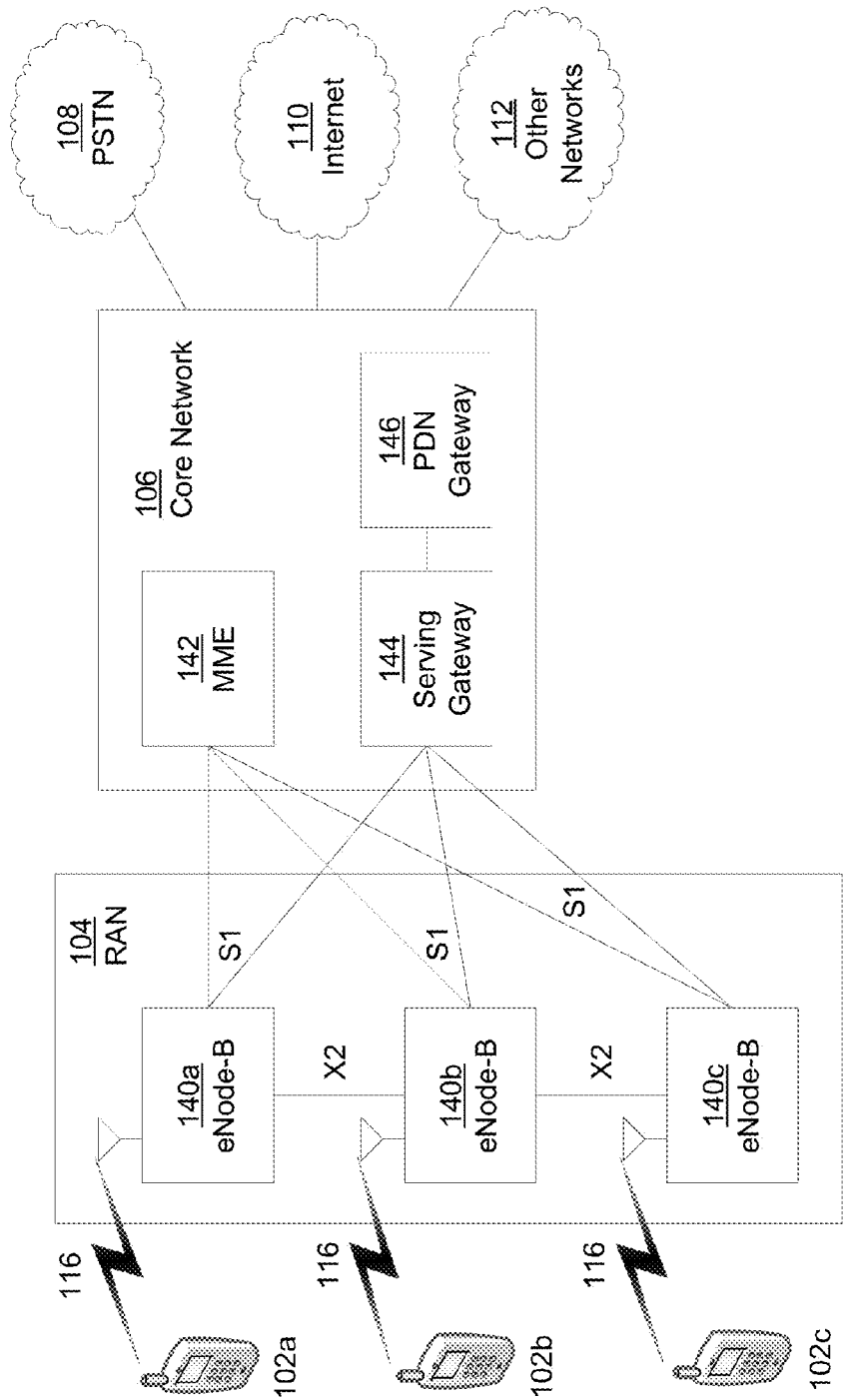
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, and 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, and 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway or entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an Si interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, and 140c in the RAN 104 via the Si interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 2:
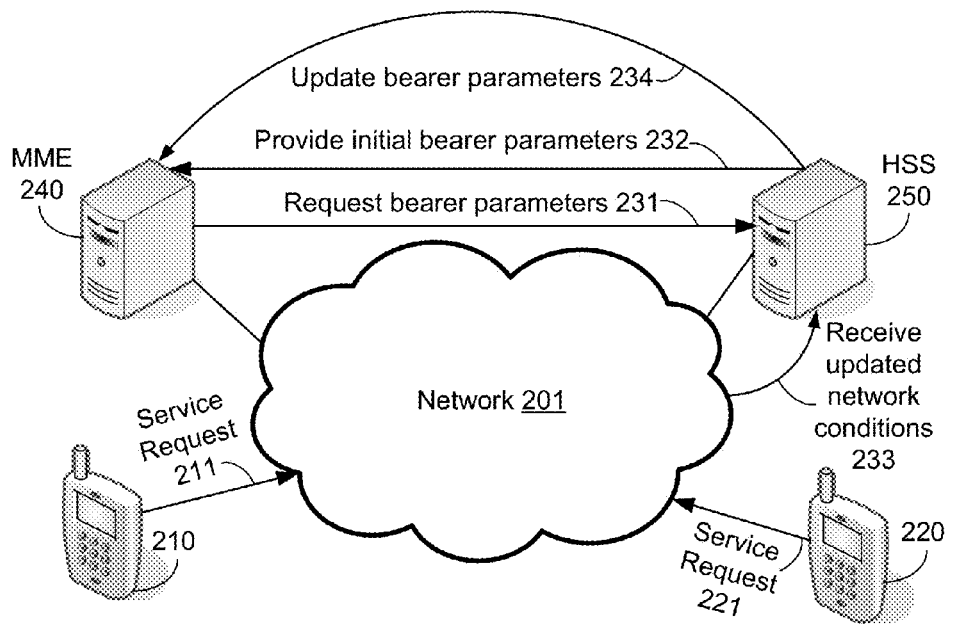
FIG. 2 illustrates a non-limiting exemplary network configuration according to a dynamic bearer management embodiment.

FIG. 2 illustrates an exemplary network configuration and signal flow that may be used in an embodiment. Mobiles devices 210 and 220 may transmit service requests 211 and 221 respectively to network 201. Note that mobile devices 210 and 220 may be any type of wireless communications device, including UEs, WTRUs, any other communications device as disclosed herein, or any other type of device capable of being configured to perform the functions and features of the present disclosure. Network 201 may be any type of communications network, including a wireless network, a wired network, and a combination thereof, implementing any number and type of communications protocols and technologies. All such embodiments are contemplated as within the scope of the present disclosure.

Service requests 211 and 221 may be received by mobility management entity (MME) 240 via network 201. MME 240 may be responsible for bearer establishment, activation, and/or deactivation. MME 240 may transmit request 231 to home subscriber server (HSS) 250 for bearer parameters for each of the bearers to be established for mobile devices 210 and 220 in response to service requests 211 and 221. HSS 250 may be any type of home subscriber server, home location register (HLR), or any other device or multiple devices that may perform any of the functions described herein. HSS 250 may respond to request 231 by providing initial bearer parameters 232 that may include any QoS parameters, APN parameters, and/or any other data or information that may be used to establish, activate, maintain, deactivate, and/or tear down any bearer path and/or any other type of communications link. Note that initial bearer parameters may be determined from parameters configured at HSS 250 statically, or may be the current parameters to be used based on information received by HSS 250 about network conditions, such as current utilization, congestion, etc.

Upon receiving initial bearer parameters 232, MME 240 may establish bearer paths for each of mobile devices 210 and 220 based on the received parameters. HSS 250 may receive updated network condition data 233 continuously. Such data may allow HSS 250 to determine that the parameters used in setting up bearer paths should be adjusted to account for increased or decreased network congestion, network utilization, etc. Upon determining that bearer parameters should be adjusted, HSS 250 transmit the updated bearer parameters 234 to MME 240. Note that the updated bearer parameters 234 may be applied to existing bearers by MME 240 and/or to new bearer that have been requested by mobile devices attempting to connect to network 201. Updated network conditions 233 may be received from any device in network 201 via any means.

Figure 3:
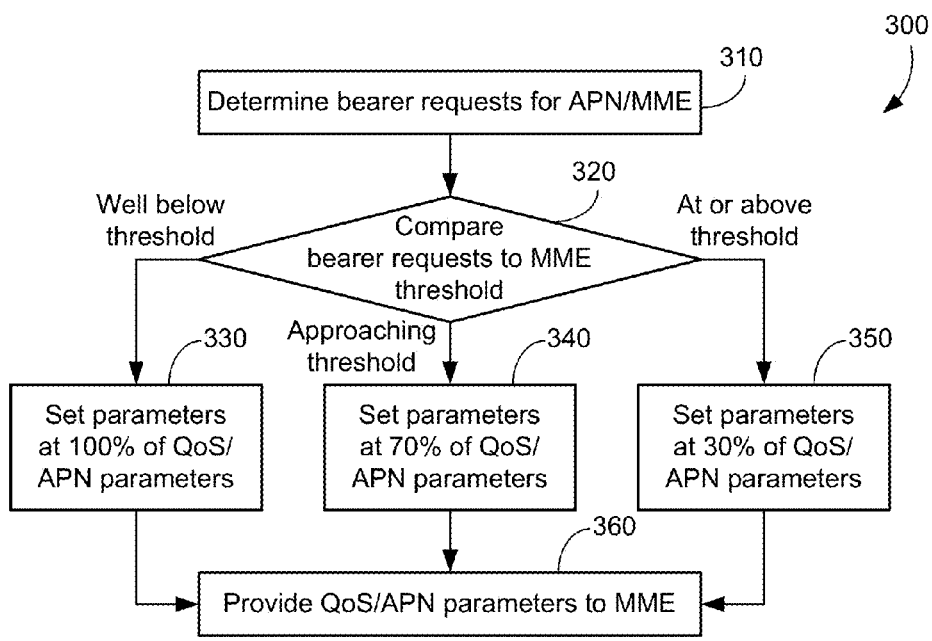
FIG. 3 illustrates a non-limiting exemplary method of implementing an embodiment.

FIG. 3 illustrates method 300 of determining and implementing adjustments to bearer parameters that may, for example, be performed by an HSS such as HSS 250 of FIG. 2. Note that any of the functions and/or actions described in regard to any of the blocks of method 300 may be performed in any order, in isolation, with a subset of other functions and/or actions described in regard to any of the other blocks of method 300, and in combination with other functions and/or actions, including those described herein and those not set forth herein. All such embodiments are contemplated as within the scope of the present disclosure.

In an embodiment, bearer parameter adjustments may be based on a current number of bearers or bearer requests compared to a threshold or total number of bearers or bearer requests that a particular MME may be capable of supporting. For example, one MME may be configured to support up to 1000 bearer requests, and a threshold associated with the MME may be 70% bearer utilization, or 700 bearer requests serviced at a particular time. Alternatively, such adjustments may be based on a current number of bearers or bearer requests compared to a threshold or total number of bearers or bearer requests that a particular network, network section, and/or network device associated with an APN may be capable of supporting. At block 310, an HSS may determine a current number of bearer requests. This data may be collected by the HSS as the HSS responds to requests from an MME for bearer parameters. For example, the HSS may tabulate bearer parameter requests and determine a total number of bearer parameter requests. Alternatively, the HSS may query an MME to determine a number of active or requested bearers. Any other means of determining a current number of bearer requests or active and/or established bearers is contemplated as within the scope of the present disclosure.

At block 320, the HSS may compare the number of bearer requests or active and/or established bearers to a threshold associated with the MME and/or APN servicing those bearers. If the number of bearer requests or active and/or established bearers is substantially below the threshold associated with the MME and/or APN servicing those bearers, for example at under 50% where the threshold is 70%, at block 330 the parameters that the HSS will provide to the MME will be 100% of the QoS and/or APN parameters. For example, bearer parameters associated with the bandwidth per bearer will be set such that the bearer provides 100% of the bandwidth allotted for the mobile device that will use the bearer.

If the number of bearer requests or active and/or established bearers is approaching the threshold associated with the MME and/or APN servicing those bearers, for example between 50% and 70% where the threshold is 70%, at block 340 the parameters that the HSS will provide to the MME will be reduced from 100%, for example, 70% of the QoS and/or APN parameters. For example, bearer parameters associated with the bandwidth per bearer will be set such that the bearer provides 70% of the bandwidth allotted for the mobile device that will use the bearer. Note that the particular percentages used herein are only examples, and any other percentage of QoS/APN parameters and/or any other thresholds may be used and are contemplated as within the scope of the present disclosure.

If the number of bearer requests or active and/or established bearers is at or above the threshold associated with the MME and/or APN servicing those bearers, for example between at 70% or more where the threshold is 70%, at block 350 the parameters that the HSS will provide to the MME will be even more greatly reduced from 100%, for example, 30% of the QoS and/or APN parameters. For example, bearer parameters associated with the bandwidth per bearer will be set such that the bearer provides 30% of the bandwidth allotted for the mobile device that will use the bearer. Note again that these particular percentages are used only as examples, and any other percentage of QoS/APN parameters and/or any other thresholds may be used and are contemplated as within the scope of the present disclosure.

Once the QoS and/or APN parameters are set for the bearer, at block 360 these parameters may be provided to the MME for bearer establishment, activation, and maintenance. Note that in this embodiment, the MME is not required to have knowledge of network conditions or even of its own quantity and qualities of bearer paths activated, established, requested, maintained, etc. However, in other embodiment the MME may be more active in the dynamic bearer management systems and methods described herein, as set forth below.

While percentages of available bearer requests or supportable established bearers are discussed in regard to method 300, other metrics may be used to determine any adjustments to, or values for, bearer parameters that may be provided from an HSS to an MME. For example, in an embodiment, the percentage in use of available bandwidth supportable by an MME may be used and compared to thresholds for determining any adjustments to QoS and/or APN parameters. In another embodiment, times of day or days of the week may be used to determine any adjustments to QoS and/or APN parameters. For example, if a particular time period is associated with higher congestion, then bearer requests during that time period may be allotted lower percentages of QoS and/or APN parameters. Any other criteria may be used to determine whether QoS and/or APN parameters are to be adjusted and the amount and/or type of adjustment of such parameters. All such embodiments are contemplated as within the scope of the present disclosure.

Figure 4:
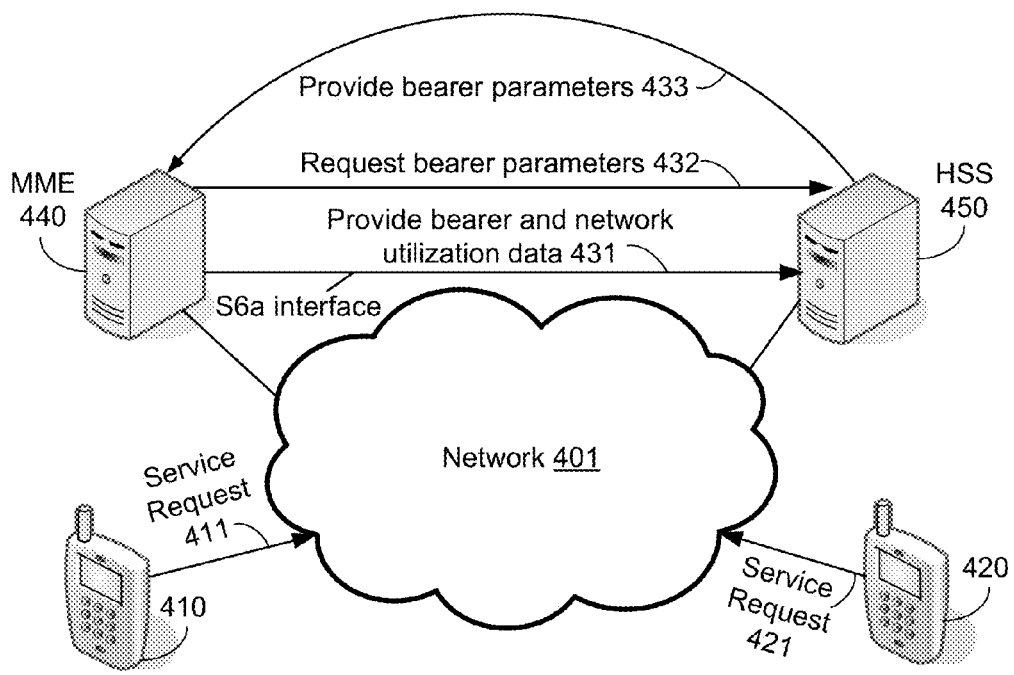
FIG. 4 illustrates a non-limiting exemplary network configuration according to a dynamic bearer management embodiment.

FIG. 4 illustrates an exemplary network configuration and signal flow that may be used in an embodiment. Mobiles devices 410 and 420 may transmit service requests 411 and 421 respectively to network 401. Here again, mobile devices 410 and 420 may be any type of wireless communications device, including UEs, WTRUs, any other communications device as disclosed herein, or any other type of device capable of being configured to perform the functions and features of the present disclosure. Network 401 may be any type of communications network, including a wireless network, a wired network, and a combination thereof, implementing any number and type of communications protocols and technologies. All such embodiments are contemplated as within the scope of the present disclosure.

In an embodiment, MME 440 may transmit bearer and/or network utilization data 431 to HSS 450. In such embodiments, MME 440 may determine network resource utilization data for the portion of the network in which it is operating or with which it is otherwise associated. Such data may include, but is not limited to, bandwidth utilization, a number of pending bearer requests, a number of established bearers, a percentage of pending bearers compared to a threshold or total number of supportable bearers, a percentage of established bearers compared to a threshold or total number of supportable bearers, and/or any other network utilization data. In an embodiment, an additional field may be added to, or a field may be used in, the LTE S6a interface between MME 440 and HSS 450. This field may be labeled "APN USAGE". This field may be used to transmit the network and/or bearer utilization data. Note that this field may be used by some other communications means between an HSS and an MME other than the S6a interface. HSS 450 may use this data to determine the quantity and quality of QoS and/or APN parameters to provide to MME 440 upon receipt of requests to provide bearer parameters. HSS 450 may use any method and/or means to make this determination, including method 300 of FIG. 3 and any other method or means set forth herein, and any other method or means not disclosed herein. All such embodiments are contemplated as within the scope of the present disclosure.

Service requests 411 and 421 may be received by MME 440 via network 401. MME 440 may transmit request 432 to HSS 450 for bearer parameters for each of the bearers to be established for mobile devices 410 and 420 in response to service requests 411 and 421. HSS 450, like HSS 250, may be any type of HSS, HLR, or any other device or multiple devices that may perform any of the functions described herein. HSS 450 may respond to request 432 by providing bearer parameters 433 that may include any QoS parameters, APN parameters, and/or any other data or information that may be used to establish, activate, maintain, deactivate, and/or tear down any bearer path and/or any other type of communications link. Such parameters may be determined based on the data 431 received from MME 440, in an embodiment via the S6a interface, that reflects network conditions, such as current utilization, congestion, current and/or pending bearers, etc. Note that in this embodiment, a single MME interacts with an HSS to determine any adjustments to QoS and/or APN parameters. However, in other embodiments, an HSS may interact with several MMEs to implement network-wide dynamic bearer management or dynamic bearer management for portions of a network serviced by multiple MMEs as set forth below.

Figure 5:
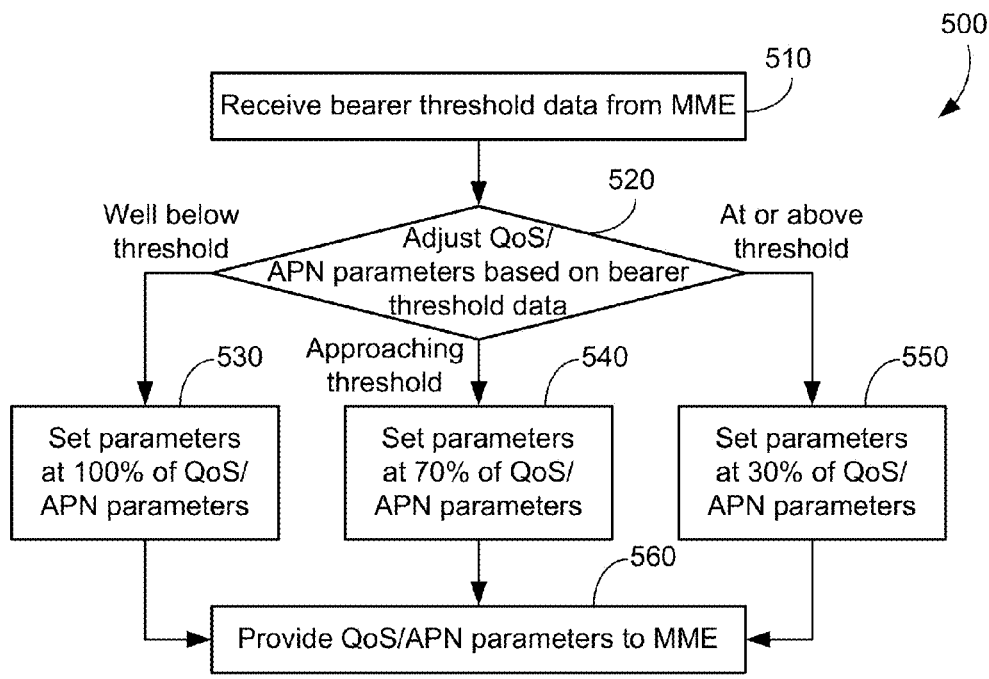
FIG. 5 illustrates another non-limiting exemplary method of implementing an embodiment.

FIG. 5 illustrates method 500 of determining and implementing adjustments to bearer parameters that may, for example, be performed by an HSS such as HSS 450 of FIG. 4. Note that any of the functions and/or actions described in regard to any of the blocks of method 500 may be performed in any order, in isolation, with a subset of other functions and/or actions described in regard to any of the other blocks of method 500, and in combination with other functions and/or actions, including those described herein and those not set forth herein. All such embodiments are contemplated as within the scope of the present disclosure.

In this embodiment, as in the embodiment of method 300 in FIG. 3, bearer parameter adjustments may be based on a current number of bearers or bearer requests compared to a threshold or total number of bearers or bearer requests that a particular MME may be capable of supporting. However, unlike in method 300, the determination of the percentage of bearers requested or established compared to the total number of supportable bearers may be determined by the MME rather than the HSS, and this data may be transmitted to the HSS for the purpose of determining QoS and/or APN parameter adjustments. At block 510, an HSS may receive bearer threshold data from an MME, in an embodiment via an S6a interface. This data may include a percentage of bearer requests or established bearers out of the number of supportable bearers, a total number of bearer requests or established bearers and a total number of supportable bearers, and/or any other data that may be used to determine whether and how to adjust QoS and/or APN parameters. This data may also include indications of the proximity of current bearer requests or established bearers to one or more thresholds.

At block 520, the HSS may how to adjust the QoS and/or APN parameters based on the bearer threshold data received at block 510. If the bearer threshold data indicates that the number of bearers established or requested is substantially below a threshold associated with the MME and/or APN servicing those bearers, for example at under 50% where the threshold is 70%, at block 530 the parameters that the HSS will provide to the MME may be 100% of the QoS and/or APN parameters. For example, bearer parameters associated with the bandwidth per bearer will be set such that the bearer provides 100% of the bandwidth allotted for the mobile device that will use the bearer.

If the bearer threshold data indicates that the number of bearers established or requested is approaching the threshold associated with the MME and/or APN servicing those bearers, for example between 50% and 70% where the threshold is 70%, at block 540 the parameters that the HSS will provide to the MME may be reduced from 100%, for example, 70% of the QoS and/or APN parameters. For example, bearer parameters associated with the bandwidth per bearer will be set such that the bearer provides 70% of the bandwidth allotted for the mobile device that will use the bearer. Note that the particular percentages used herein are only examples, and any other percentage of QoS/APN parameters and/or any other thresholds may be used and are contemplated as within the scope of the present disclosure.

If the bearer threshold data indicates that the number of bearers established or requested is at or above the threshold associated with the MME and/or APN servicing those bearers, for example between at 70% or more where the threshold is 70%, at block 550 the parameters that the HSS may provide to the MME may be even more greatly reduced from 100%, for example, 30% of the QoS and/or APN parameters. For example, bearer parameters associated with the bandwidth per bearer will be set such that the bearer provides 30% of the bandwidth allotted for the mobile device that will use the bearer. Note again that these particular percentages are used only as examples, and any other percentage of QoS/APN parameters and/or any other thresholds may be used and are contemplated as within the scope of the present disclosure.

Once the QoS and/or APN parameters are set for the bearer, at block 560 these parameters may be provided to the MME for bearer establishment, activation, and maintenance. Note that in this embodiment, the MME is not required to have knowledge of network conditions or even of its own quantity and qualities of bearer paths activated, established, requested, maintained, etc. However, in other embodiment the MME may be more active in the dynamic bearer management systems and methods described herein, as set forth below.

While percentages of available bearer requests or supportable established bearers are discussed in regard to method 500, other metrics may be used to determine any adjustments to, or values for, bearer parameters that may be provided from an HSS to an MME. For example, in an embodiment, the percentage in use of available bandwidth supportable by an MME may be used and compared to thresholds for determining any adjustments to QoS and/or APN parameters. In another embodiment, times of day or days of the week may be used to determine any adjustments to QoS and/or APN parameters. For example, if a particular time period is associated with higher congestion, then bearer requests during that time period may be allotted lower percentages of QoS and/or APN parameters. Any other criteria may be used to determine whether QoS and/or APN parameters are to be adjusted and the amount and/or type of adjustment of such parameters. All such embodiments are contemplated as within the scope of the present disclosure.

Figure 6:
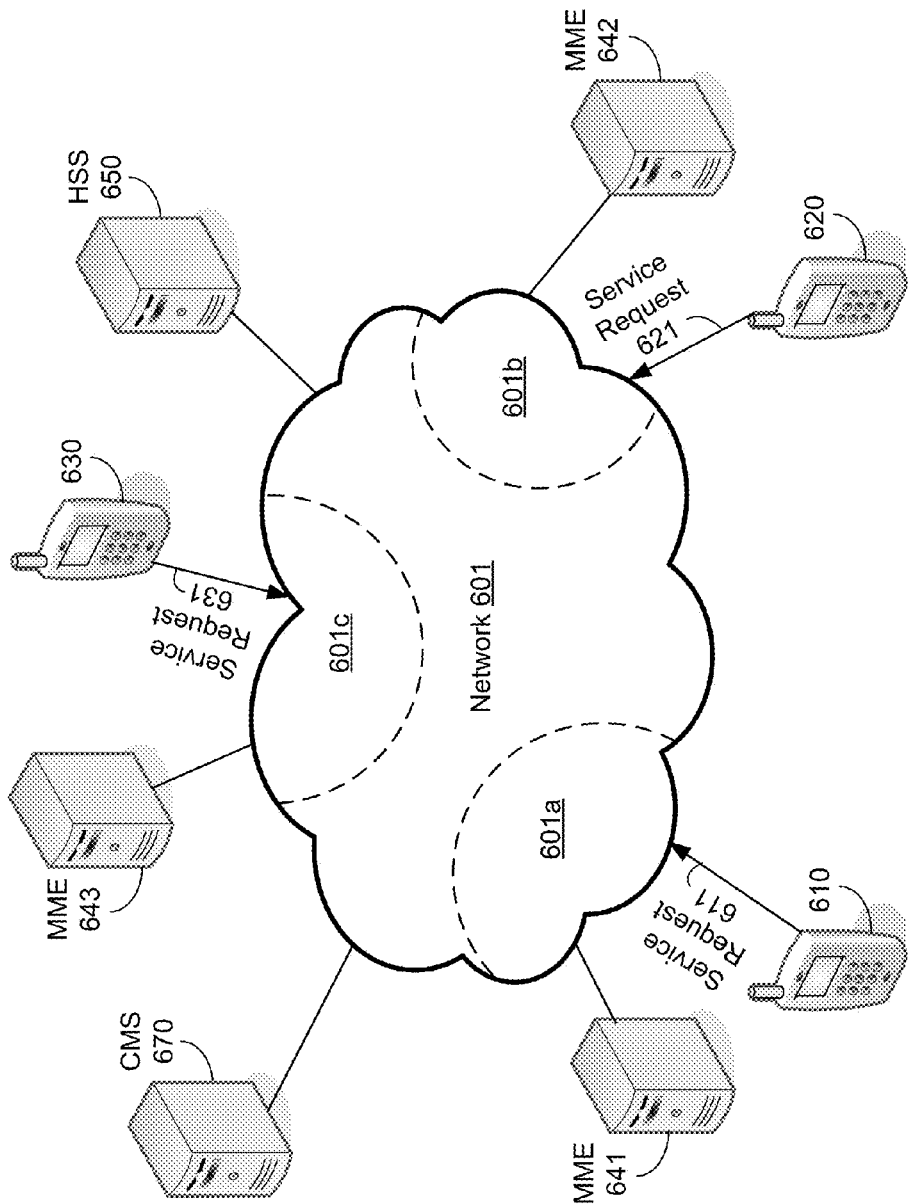
FIG. 6 illustrates a non-limiting exemplary network configuration according to a dynamic bearer management embodiment.

FIG. 6 illustrates an exemplary network configuration that may be used in an embodiment. Mobiles devices 610, 620, and 630 may transmit service requests 611, 621, and 663, respectively, to network 601. Here again, mobile devices 610, 620, and 630 may each be any type of wireless communications device, including UEs, WTRUs, any other communications device as disclosed herein, or any other type of device capable of being configured to perform the functions and features of the present disclosure. Network 601 may be any type of communications network, including a wireless network, a wired network, and a combination thereof, implementing any number and type of communications protocols and technologies. All such embodiments are contemplated as within the scope of the present disclosure.

In an embodiment, network 601 may include areas 601*a*, 601*b*, and 601*c*, each of which may represent some type of network division or subsection, such as a coverage area or simply an area of network 601 that is serviced by a particular MME. MME 641 may service area 601*a*, MME 642 may service area 601*b*, and MME 643 may service area 601*c*.

Each of MMEs 641, 642, and 643 may transmit bearer and/or network utilization data to HSS 650. In such embodiments, each of MMEs 641, 642, and 643 may determine network resource utilization data for the portion of the network in which each respective MME is operating or with which each respective MME is otherwise associated. Such data may include, but is not limited to, bandwidth utilization, a number of pending bearer requests, a number of established bearers, a percentage of pending bearers compared to a threshold or total number of supportable bearers, a percentage of established bearers compared to a threshold or total number of supportable bearers, and/or any other network utilization data. In an embodiment, an additional field may be added to, or a field may be used in, the LTE S6a interface between each of MMEs 641, 642, and 643 and HSS 650. This field may be labeled "APN USAGE". This field may be used to transmit the network and/or bearer utilization data. Note that this field may be used by some other communications means between an HSS and an MME other than the S6a interface. HSS 650 may use this data to determine the quantity and quality of QoS and/or APN parameters to provide to each of MMEs 641, 642, and 643 upon receipt of requests to provide bearer parameters.

In making this determination, HSS 650 may take into account the network utilization and/or bearer data provided by each of MMEs 641, 642, and 643 to adjust QoS and/or APN parameters based on information across several network areas, such as areas 601a, 601b, and 601c, rather than just for a single area. For example, HSS 650 may determine that while MME 643 is servicing only 50% of it supportable bearers, the traffic load in area 601c may be approaching 80% of available bandwidth. HSS 650 may further determine that while MME 641 may be servicing 70% of its supportable bearers, the traffic load in area 601a is under 50% of available bandwidth. This may lead HSS 650 to configure QoS and/or APN parameters for MME 643 at a lower percentage than the QoS and/or APN parameters for MME 641. Alternatively, HSS 650 may determine that while MME 642 is servicing only 50% of it supportable bearers and the traffic load in area 601b is only approaching 50% of available bandwidth, the other MMEs and areas in the network are highly congested. Therefore, HSS 650 may configure QoS and/or APN parameters for MME 642 at less than 100% in order to mitigate additional congestion. Any other determinations and means and methods of determining QoS and/or APN parameter adjustments based on data from a plurality of MMEs and/or network areas or subsections are contemplated as within the scope of the present disclosure.

In an alternative embodiment, similar determinations may be made by HSS 650 based on data collected and stored at HSS 650 rather than received from the MMEs. For example, rather than receiving network resource and/or bearer utilization data for each portion of the network from each of MMEs 641, 642, and 643, HSS 650 may instead track and record service requests received from each of MMEs 641, 642, and 643 and determine for itself what the percentage of bearer requests or established bearer out of the number of supportable bearer, the percentage usage compared to a threshold, etc.

Service requests 611, 621, and 631 may be received by MMEs 641, 642, and 643, respectively, via network 601. Each of MMEs 641, 642, and 643 may transmit service requests 611, 621, and 631 to HSS 650 for QoS and/or APN bearer parameters for each of the bearers to be established for mobile devices 610, 620, and 630 in response to the respective service requests. HSS 650 may respond to the requests by providing bearer parameters to each of MMEs 641, 642, and 643 that may include any QoS parameters, APN parameters, and/or any other data or information that may be used to establish, activate, maintain, deactivate, and/or tear down any bearer path and/or any other type of communications link. Such parameters may be determined based on the data received from MMEs 641, 642, and 643, in an embodiment via the S6a interface, and alternatively, or in addition, via an "APN USAGE" field, that reflects network conditions, such as current utilization, congestion, current and/or pending bearers, etc.

Figure 7:
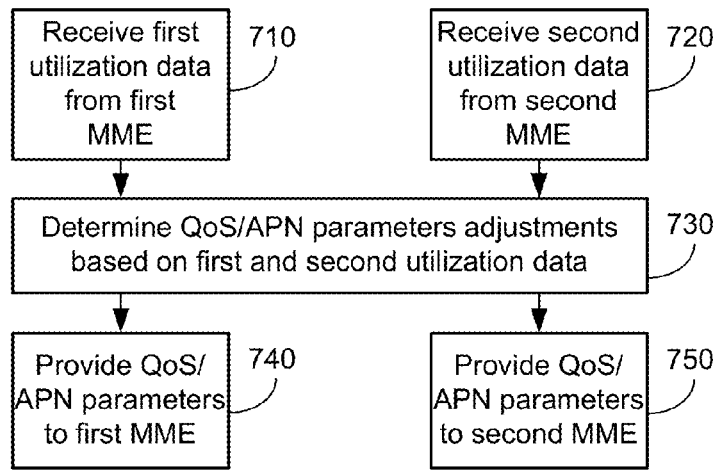
FIG. 7 illustrates another non-limiting exemplary method of implementing an embodiment.

FIG. 7 illustrates method 700 of determining and implementing adjustments to bearer parameters that may, for example, be performed by an HSS such as HSS 650 of FIG. 6. Note that any of the functions and/or actions described in regard to any of the blocks of method 700 may be performed in any order, in isolation, with a subset of other functions and/or actions described in regard to any of the other blocks of method 700, and in combination with other functions and/or actions, including those described herein and those not set forth herein. All such embodiments are contemplated as within the scope of the present disclosure.

In this embodiment, the determination of the percentage of bearers requested or established compared to the total number of supportable bearers may be determined by the MME and provided to the HSS, or determined by the HSS based data that has been stored and/or captured by the HSS. At block 710, an HSS may receive utilization data from a first MME, in an embodiment via an S6a interface, and in another embodiment, in an "APN USAGE" field. This utilization data may include a percentage of bearer requests or established bearers out of the number of supportable bearers, a total number of bearer requests or established bearers and a total number of supportable bearers, and/or any other data that may be used to determine whether and how to adjust QoS and/or APN parameters. This data may also include indications of the proximity of current bearer requests or established bearers to one or more thresholds. Alternatively, at block 710, the HSS may determine such data itself, in an embodiment based on service requests received from one or more MMEs. At block 720, similar data may be received from a second MME and/or similar functions are performed in regard to the second MME.

At block 730, the HSS may how to adjust the QoS and/or APN parameters based on the utilization data received at blocks 710 and 720. In an embodiment, the HSS may take into account the utilization data received from a plurality of MMEs in determining how to adjust QoS and/or APN parameters for a service request from one MME, rather than only using utilization data from one MME or one network area in making such a determination. Any of the methods and means described herein, and any other methods and means, may be used to make the determination and perform corresponding adjustments to QoS and/or APN parameters.

Once the QoS and/or APN parameters are set for each MME or network area, at blocks 740 and 750 these parameters may be provided to the respective MMEs for bearer establishment, activation, and maintenance, in an embodiment, upon receiving a service request from the respective MME. This process may be repeated continuously so that the HSS may provide optimum or improved management of bearers as they are established by MMEs.

In an embodiment, a congestion management server may be introduced into a network to provide network-wide signaling traffic congestion control and malicious signaling traffic control. Referring again to FIG. 6, congestion management server (CMS) 670 may be configured in or communicatively connected to network 601. CMS 670 may receive periodic, near-real-time, or real-time updates from network devices, including, but not limited to, devices such as HSS 650 and MMEs 641, 642, and 643. Such updates may include network performance and congestion data relating to signaling traffic, such as service requests and any other traffic that is not user data but rather used to establish and facilitate the transmission of user data. Such network performance and congestion data may include signaling traffic bandwidth currently being utilized (absolute utilization and/or in percentage utilization of available network resources) and transaction rates or levels, such as transactions per second. For example, CMS 670 may receive signaling traffic data such as transactions per second occurring on a network device and/or bearer requests per second, signaling traffic bandwidth utilization in absolute numbers and/or as percentages of signaling traffic capacity for a network device, etc. Any other data that may be used to determine and address signaling traffic congestion and/or other network traffic issues may be received by CMS 670.

CMS 670 may determine or be configured with threshold values that may be applicable to each network device such that when CMS 670 determines that the signaling traffic is approaching or exceeding such threshold values, CMS determines that actions may be taken to address the signaling congestion and network traffic on such a device. In an embodiment, CMS 670 may detect that a particular network element, for example MME 641, is experiencing signaling congestion or signaling traffic loads that meet or exceed a threshold. In response, CMS 670 may use data received from MME 641 and/or HSS 650 to determine a subset of UEs that may be responsible for such traffic loads. For example, CMS 670 may determine that mobile device 610 is transmitting an unusually high number of service requests, thereby congesting the area of the network serviced by HSS 650. CMS 670 may make this determination by detecting heavy signaling traffic on MME 641 (as reported by MME 641 to CMS 670) and may determine from data received by HSS 650 that much of the signaling traffic is being generated by mobile device 610. For example, HSS 650 may maintain records of service requests received that include an identifier of the mobile device originating such service requests. CMS 670 may receive such data from HSS 650 as HSS 650 proactively sends such data to CMS 670 or as HSS 650 responds to queries for such data from CMS 670.

Upon determining that mobile device 610 is causing signaling congestion, CMS 670 may transmit one or more commands to mobile device 610 instructing mobile device 610 to stop transmitting signaling traffic or to slow down the transmission of signaling traffic. Alternatively, CMS 670 may transmit one or more commands to mobile device 610 instructing mobile device 610 to stop transmitting all signaling traffic or to slow down the transmission of all signaling traffic. Such commands may be issued directly to mobile device 610 from CMS 670 and delivered via network 601, or such commands may be transmitted to one or more other network devices and relayed via those devices and network 601 to mobile device 610. Such other network devices may include MME 641, HSS 650, or any other network device.

If mobile device 610 fails to stop or reduce its signaling traffic transmission, which CMS 670 may detect via the similar means as those used to initially detect the signaling traffic congestion, CMS 670 may take steps to tear down the bearers in use by mobile device 610. For example, CMS 670 may instruct MME 641 and/or HSS 650 to not respond or to negatively respond to any further bearer requests from mobile device 610. CMS 670 may also instruct MME 641 and/or HSS 650 to tear down any established bearer or other communications links for mobile device 610 that may be used to facilitate signaling traffic. As this is occurring, CMS 670 may continue to send commands to mobile device 610 to stop or reduce it signaling traffic transmission. Finally, if signaling traffic generation continues, for example, mobile device 610 continues to transmit service requests, CMS 670 may instruct devices in the network to disconnect mobile device 610 entirely from the network. This may take any form, including instructing base stations to disregard and/or drop all signaling traffic received from mobile device 610.

In an embodiment, a list of such offending devices may be maintained at CMS 670. Thus, where mobile device 610 is continually detected driving up signaling traffic and not responding to commands to reduce or cease such traffic, CMS 670 may place an identifier of mobile device 610 on a "gray list" that may be propagated throughout the network as needed to prevent mobile device 610 from successfully generating signaling traffic beyond a base station or any other network device. This list may be transmitted to a customer service device that will generate a notice to the user of mobile device 610 notifying the user that the device is compromised or otherwise adversely affecting network 601. This notice may be an automated notice that may be transmitted to the user of mobile device 610 using any means, including alternate means to those that may need to use the services of network 601 that are now blocked, and/or a notice to a human operator that may then contact the user of mobile device 610 using any means. Mobile device 610 may be removed from such a gray list manually upon confirmation by a human operator that mobile device 610 is no longer compromised.

In an alternative embodiment, CMS 670 may direct a policy manager to throttle or otherwise reduce the amount of bandwidth available to mobile device 610. A policy manager may be a separate device, system, or combination of one or more of either of these that may control network resources in network 601 in order to affect changes in real-time on network 601. Alternatively, the policy manager may be a component of CMS 670 or of any other device within or communicatively connected to network 601. In such an embodiment, CMS 670 may provide information to the policy manager that allows the policy manager to identify mobile device 610 and/or any network resources that provide services to mobile device 610. CMS 670 may also provide instructions to the policy manager to limit or otherwise mitigate the heavy traffic being generated by mobile device 610. In response, the policy manager may instruct the appropriate network devices to reduce the bandwidth allotted to mobile device 610 and thereby reduce the impact of the traffic generated by mobile device 610. Note that the traffic controlled by the policy manager in one embodiment is signaling traffic rather than user data traffic.

Figure 8:
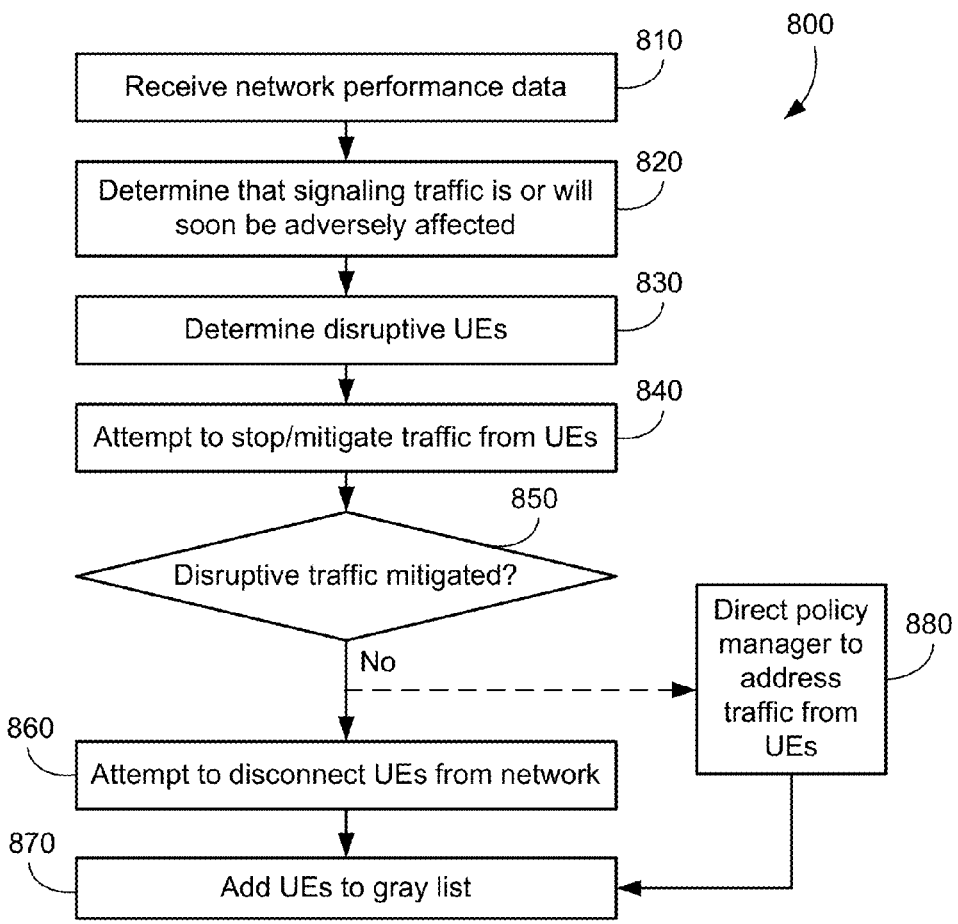
FIG. 8 illustrates another non-limiting exemplary method of implementing an embodiment.

FIG. 8 illustrates method 800 of operating a CMS, such as CMS 670 of FIG. 6. Note that any of the functions and/or actions described in regard to any of the blocks of method 800 may be performed in any order, in isolation, with a subset of other functions and/or actions described in regard to any of the other blocks of method 800, and in combination with other functions and/or actions, including those described herein and those not set forth herein. All such embodiments are contemplated as within the scope of the present disclosure.

A block 810, a CMS may receive periodic, near-real-time, or real-time updates from network devices, including, but not limited to, devices such as an HSS, an MME, a base station, etc. Such updates may include network performance and congestion data relating to signaling traffic, such as service requests and any other traffic that is not user data but rather used to establish and facilitate the transmission of user data. As noted above, such network performance and congestion data may include signaling traffic bandwidth currently being utilized (absolute utilization and/or in percentage utilization of available network resources) and transaction rates or levels, such as transactions per second. For example, the CMS may receive signaling traffic data such as transactions per second occurring on a network device and/or bearer requests per second, signaling traffic bandwidth utilization in absolute numbers and/or as percentages of signaling traffic capacity for a network device, etc. Any other data that may be used to determine and address signaling traffic congestion and/or other network traffic issues may be received by the CMS. Such data may be received via any means, including via the S6a interface, for example, when the CMS is combined with an HSS as a single network entity.

At block 820, the CMS may determine that signaling traffic is being adversely affected or may soon be adversely affected. In an embodiment, the CMS may determine or be configured with threshold values that may be applicable to each network device such that when the CMS determines that the signaling traffic on or facilitated by that device is approaching or exceeding such threshold values, the CMS determines that the signaling traffic is or soon will be adversely affected. Upon this determination, the CMS may take actions to address the signaling congestion and network traffic on such a device. At block 830, the CMS may use data received from one or more network devices to determine one or a subset of UEs that may be responsible for the disruptive signaling traffic load(s). For example, the CMS may determine that a particular mobile device or set of mobile devices is transmitting an unusually high number of service requests, thereby congesting a device or area of the network. The CMS may make this determination by detecting heavy signaling traffic on one or more MMEs or HSSs (as reported by such MMEs and/or HSSs to the CMS) and may determine from data received by the MME or HSS that much of the signaling traffic is being generated by one or more particular mobile devices. For example, an HSS may maintain records of service requests received that include an identifier of the mobile device originating each such service requests. The CMS may receive such data from the HSS proactively or in a responses to queries for such data transmitted from the CMS to the HSS.

Upon determining the one or more mobile devices that are causing signaling congestion, at block 840 the CMS may attempt to stop or mitigate the problematic traffic. In an embodiment, the CMS may transmit one or more commands to such mobile devices instructing the mobile devices to stop transmitting signaling traffic or to slow down the transmission of signaling traffic. Alternatively, the CMS may transmit one or more commands to such mobile devices instructing the mobile devices to stop transmitting all signaling traffic or to slow down the transmission of all signaling traffic. Such commands may be issued directly to such mobile devices from the CMS and delivered via the network, or such commands may be transmitted to one or more other network devices and relayed via those devices and the network to such mobile devices. Other network devices that may assist in mitigating the problematic traffic may include MMEs, HSSs, base stations, or any other network device.

At block 850, the CMS may determine if the disruptive traffic has ceased or otherwise been mitigated. This may be determined using any means, including the CMS detecting continuing disruptive traffic via similar means as those used to initially detect the signaling traffic congestion. If the disruptive mobile devices fail to stop or reduce their signaling traffic transmission, at block 860 the CMS may take steps to completely disconnect such mobile devices from the network. In an embodiment, the CMS may attempt to tear down the bearers in use by such mobile devices. For example, the CMS may instruct an MME and/or an HSS to not respond or to negatively respond to any further bearer requests from such mobile devices. The CMS may also instruct an MME and/or an HSS to tear down any established bearer or other communications links for such mobile devices that may be used to facilitate signaling traffic. As this is occurring, the CMS may continue to send commands to the disruptive mobile devices to stop or reduce their signaling traffic transmission. Finally, if signaling traffic generation continues, for example, if the mobile devices continue to transmit service requests, the CMS may instruct devices in the network to disconnect such mobile devices entirely from the network. This may take any form, including instructing base stations to disregard and/or drop all signaling traffic received from such mobile devices. If the mobile devices have ceased or adequately reduced their signaling traffic, the CMS may take no additional actions with respect to attempting to reduce the disruptive traffic. Alternatively the CMS may record the incident and use it in evaluation of future incidents and behavior of the disruptive mobile devices.

At block 870, the CMS may place an identifier of the each of the disruptive mobile devices on a gray list that may be propagated throughout the network as needed to prevent such mobile devices from successfully generating signaling traffic that may pass beyond a base station or any other network device. The gray list may be transmitted to a customer service device that will generate a notice to the users of such mobile devices notifying the users that the devices are compromised or otherwise adversely affecting the network. This notice may be an automated notice, a notice to a human operator who may then contact the users, or a combination thereof.

In an alternative embodiment, upon determining that the disruptive traffic has not been mitigated, at block 880 the CMS may direct a policy manager to throttle or otherwise reduce the amount of bandwidth available to the disruptive mobile devices. The CMS may provide information to the policy manager that allows the policy manager to identify the disruptive mobile devices and/or any network resources that provide services such mobile devices. The CMS may also provide instructions to the policy manager to limit or otherwise mitigate the heavy traffic being generated by such mobile devices. In response, the policy manager may instruct the appropriate network devices to reduce the bandwidth allotted to the disruptive mobile devices and thereby reduce the impact of the traffic generated by such mobile devices. Note that the traffic controlled by the policy manager in an embodiment is signaling traffic rather than user data traffic. Note also that in using the policy manager, the CMS may also, at block 870, add the disruptive UEs to a gray list as described herein.

The methods and systems described above assist in dynamically managing bearers, especially when network performance is affected by either or both of user data traffic and signaling traffic. By implementing the present disclosure, the user experience may be improved. Set forth below are further exemplary systems, devices, and components in which aspects of intelligent roaming and interworking may be implemented.

Figure 9:
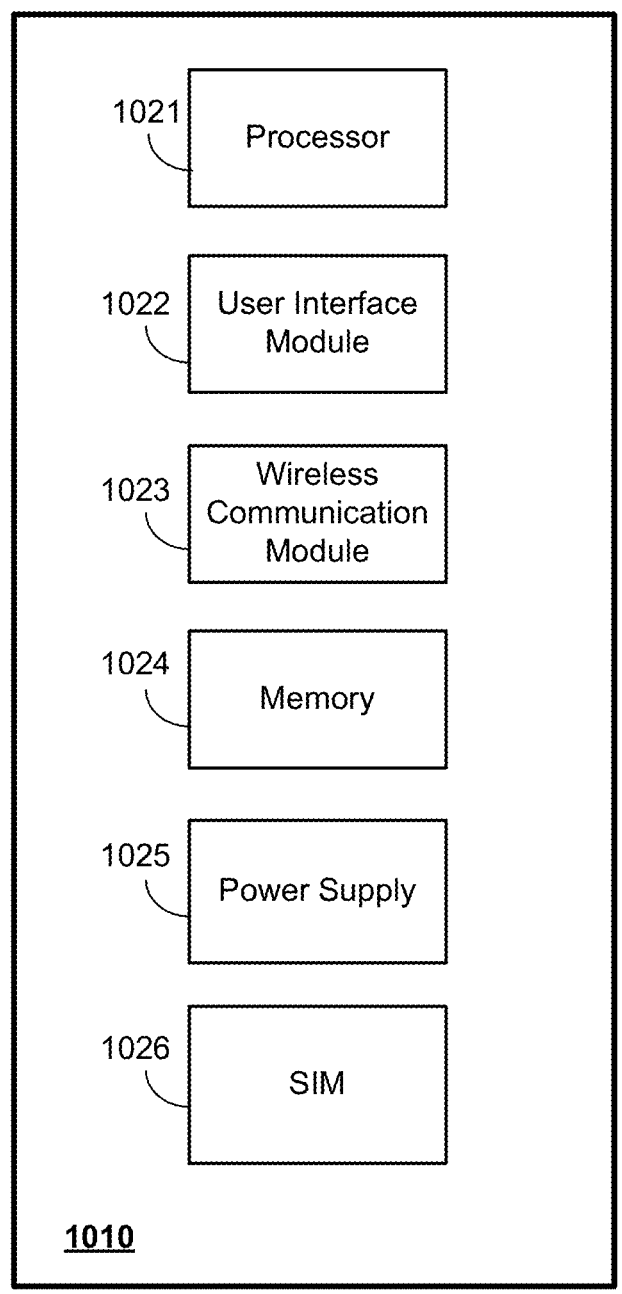
FIG. 9 is a block diagram of a non-limiting exemplary mobile device in which dynamic bearer management may be implemented.

FIG. 9 illustrates an example wireless device 1010 that may be used in connection with an embodiment. References will also be made to other figures of the present disclosure as appropriate. For example, mobile devices 210, 220, 410, 420, 610, and/or 620 may be wireless devices of the type described in regard to FIG. 9, and may have some, all, or none of the components and modules described in regard to FIG. 9. It will be appreciated that the components and modules of wireless device 1010 illustrated in FIG. 9 are illustrative, and that any number and type of components and/or modules may be present in wireless device 1010. In addition, the functions performed by any or all of the components and modules illustrated in FIG. 9 may be performed by any number of physical components. Thus, it is possible that in some embodiments the functionality of more than one component and/or module illustrated in FIG. 9 may be performed by any number or types of hardware and/or software.

Processor 1021 may be any type of circuitry that performs operations on behalf of wireless device 1010. Such circuitry may include circuitry and other components that enable processor 1021 to perform any of the functions and methods described herein. Such circuitry and other components may also enable processor 1021 to communicate and/or interact with other devices and components, for example any other component of device of wireless device 1010, in such a manner as to enable processor 118 and such other devices and/or components to perform any of the disclosed functions and methods. In one embodiment, processor 1021 executes software (i.e., computer readable instructions stored in a computer readable medium) that may include functionality related to dynamic bearer management, for example. User interface module 1022 may be any type or combination of hardware and/or software that enables a user to operate and interact with wireless device 1010, and, in one embodiment, to interact with a system or software enabling the user to place, request, and/or receive calls, text communications of any type, voicemail, voicemail notifications, voicemail content and/or data, and/or a system or software enabling the user to view, modify, or delete related software objects. For example, user interface module 1022 may include a display, physical and/or "soft" keys, voice recognition software, a microphone, a speaker and the like. Wireless communication module 1023 may be any type of transceiver including any combination of hardware and/or software that enables wireless device 1010 to communicate with wireless network equipment. Memory 1024 enables wireless device 1010 to store information, such as APNs, MNCs, MCCs, text communications content and associated data, multimedia content, software to efficiently process radio resource requests and service requests, and radio resource request processing preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 10:
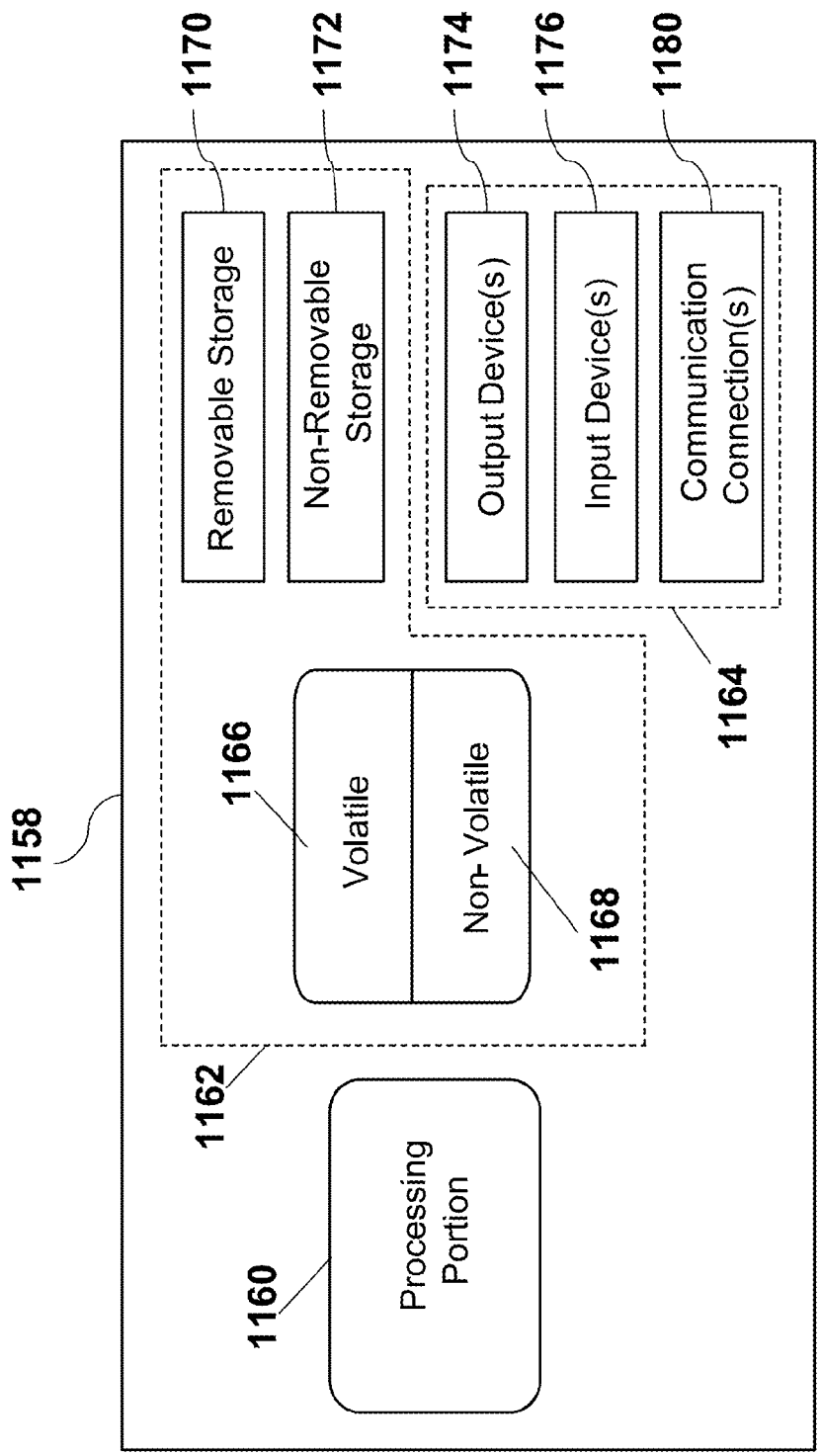
FIG. 10 is a block diagram of a non-limiting exemplary processor in which dynamic bearer management may be implemented.

FIG. 10 is a block diagram of an example processor 1158 which may be employed in any of the embodiments described herein, including as one or more components of mobile devices 210, 220, 410, 420, 610, and/or 620, as one or more components of network equipment such as MMEs 240, 440, 641, 642, and/or 643, HSSs 250, 450, and/or 650, and/or CMS 670, any other component of networks 201, 401, and/or 601, and/or any related equipment, and/or as one or more components of any third party system or subsystem that may implement any portion of the subject matter described herein. It is emphasized that the block diagram depicted in FIG. 10 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

Processor 1158 may include circuitry and other components that enable processor 1158 to perform any of the functions and methods described herein. Such circuitry and other components may also enable processor 1158 to communicate and/or interact with other devices and components, for example any other component of any device disclosed herein or any other device, in such a manner as to enable processor 1158 and such other devices and/or components to perform any of the disclosed functions and methods.

As depicted in FIG. 10, the processor 1158 comprises a processing portion 1160, a memory portion 1162, and an input/output portion 1164. The processing portion 1160, memory portion 1162, and input/output portion 1164 are coupled together (coupling not shown in FIG. 10) to allow communications between these portions. The input/output portion 1164 is capable of providing and/or receiving components, commands, and/or instructions, utilized to, for example, request and receive APNs, MNCs, and/or MCCs, establish and terminate communications sessions, transmit and receive service requests and data access request data and responses, transmit, receive, store and process text, data, and voice communications, execute software that efficiently processes radio resource requests, receive and store service requests and radio resource requests, radio resource request processing preferences and configurations, and/or perform any other function described herein.

The processor 1158 may be implemented as a client processor and/or a server processor. In a basic configuration, the processor 1158 may include at least one processing portion 1160 and memory portion 1162. The memory portion 1162 can store any information utilized in conjunction with establishing, transmitting, receiving, and/or processing text, data, and/or voice communications, communications-related data and/or content, voice calls, other telephonic communications, etc. For example, the memory portion is capable of storing APNs, MNCs, MCCs, service requests, radio resource requests, QoS and/or APN parameters, software for a dynamic bearer management, text and data communications, calls, voicemail, multimedia content, visual voicemail applications, etc. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 may include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, may include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium that can be used to store the desired information and that can be accessed by the processor 1158. Any such computer storage media may be part of the processor 1158.

The processor 1158 may also contain the communications connection(s) 1180 that allow the processor 1158 to communicate with other devices, for example through a radio access network (RAN). Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 1158 also can have input device(s) 1176 such as keyboard, keypad, mouse, pen, voice input device, touch input device, etc. Output device(s) 1174 such as a display, speakers, printer, etc. also can be included.

A RAN as described herein may comprise any telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how dynamic bearer management may be implemented with stationary and non-stationary network structures and architectures in order to dynamically manage bearers. It can be appreciated, however, that dynamic bearer management as described herein may be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also may be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, dynamic bearer management may be applied independently of the method of data transport and does not depend on any particular network architecture or underlying protocols.

Figure 11:
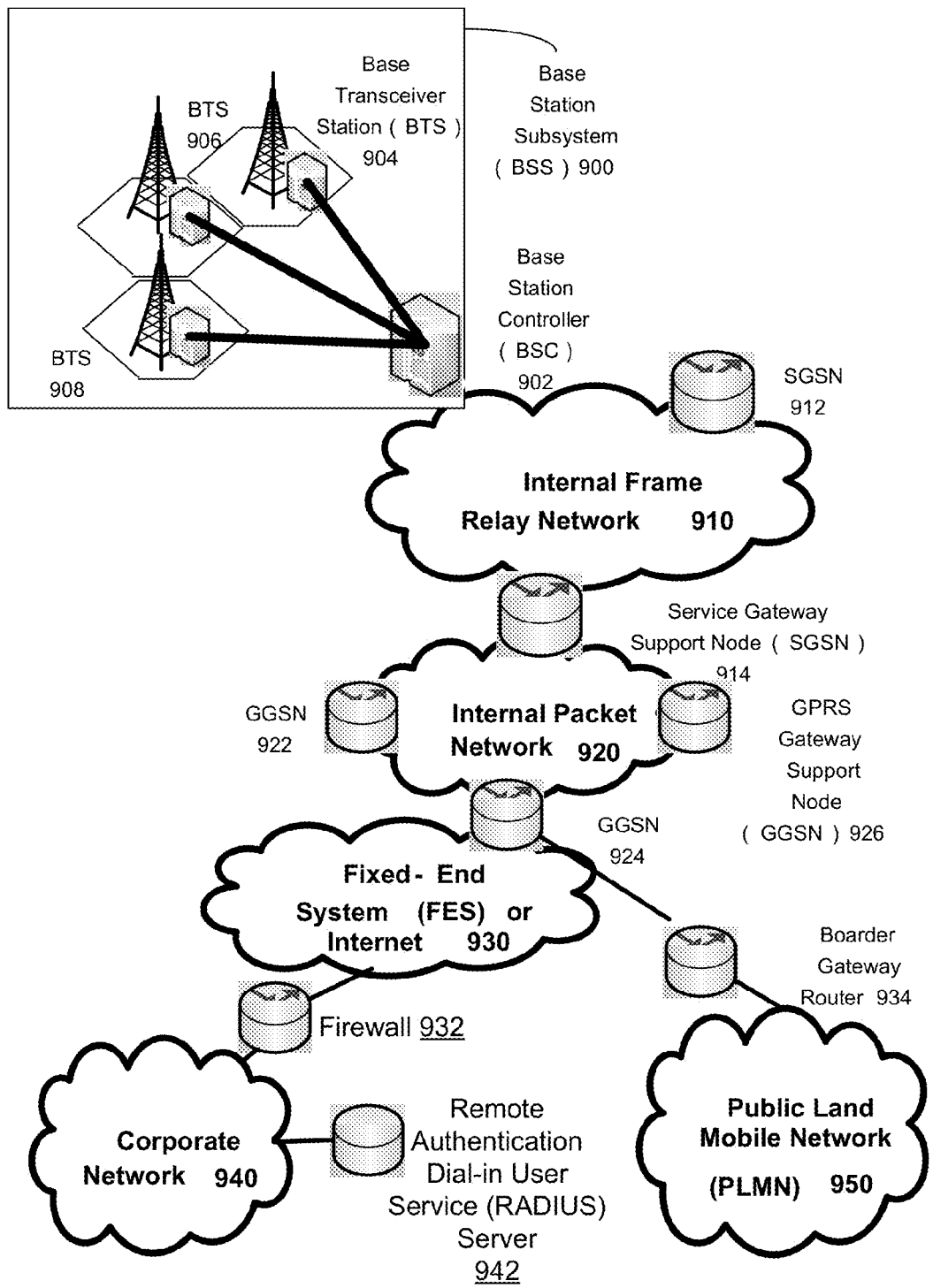
FIG. 11 is a block diagram of a non-limiting exemplary packet-based mobile cellular network environment, such as a GPRS network, in which dynamic bearer management may be implemented.

FIG. 11 depicts an overall block diagram of an exemplary packet-based mobile cellular network environment, such as a GPRS network, in which dynamic bearer management systems and methods such as those described herein may be practiced. In an example configuration, any RAN as described herein may be encompassed by or interact with the network environment depicted in FIG. 11. Similarly, mobile devices 210, 220, 410, 420, 610, and/or 620 may communicate or interact with a network environment such as that depicted in FIG. 11. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., mobile devices 210, 310, and 610) become connected to the wireless network. In exemplary fashion, the packet traffic originating from user devices (e.g., mobile devices 210, 220, 410, 420, 610, and/or 620) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 12:
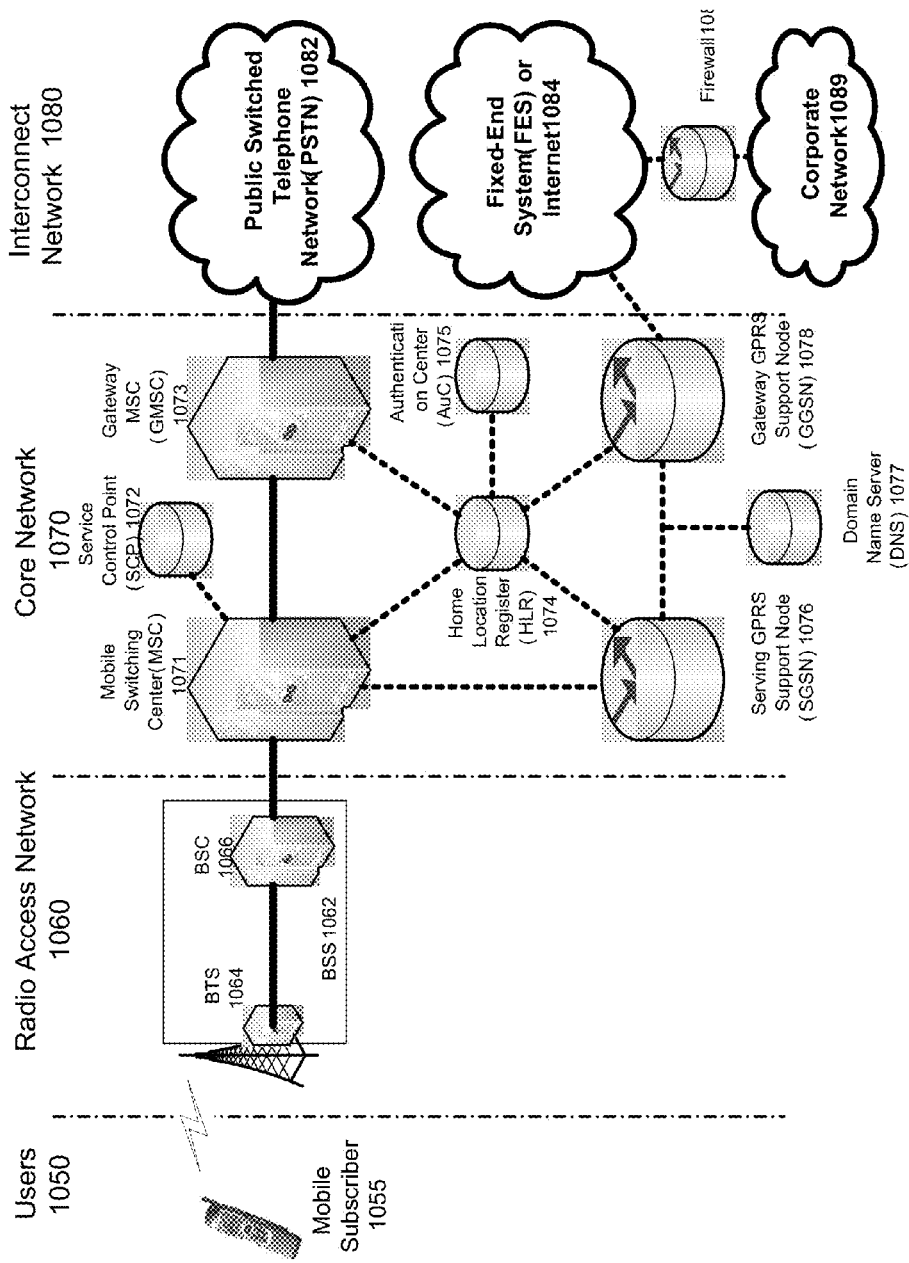
FIG. 12 illustrates a non-limiting exemplary architecture of a typical GPRS network, segmented into four groups, in which dynamic bearer management may be implemented.

FIG. 12 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 12). In an example embodiment, the device depicted as mobile subscriber 1055 may comprise any of mobile devices 210, 220, 410, 420, 610, and 620. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 12, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076 that may send the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. In some embodiments, HLR 1074 may be a device such as HSSs 250, 450, and/or 650. HLR 1074 may store static information about the subscribers such as the International Mobile Subscriber Identity (IMSI), APN profiles as described herein, subscribed services, and a key for authenticating the subscriber. HLR 1074 may also store dynamic subscriber information such as dynamic APN profiles and the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as mobile devices 210, 220, 410, 420, 610, and 620, used by an end user of a mobile cellular service or a wireless provider. When a mobile subscriber turns on his or her mobile device, the mobile device may go through an attach process by which the mobile device attaches to an SGSN of the GPRS network. In FIG. 12, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself to the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to an Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, that may be provisioned to map to one or more GGSN nodes in the core network 1070. Based on the APN, the mapped GGSN 1078 may access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of dynamic bearer management systems and methods such as those described herein may include, but are not limited to, Gateway GPRS Support Node tables, Fixed End System router tables, firewall systems, VPN tunnels, and any number of other network elements as required by the particular digital network.

Figure 13:
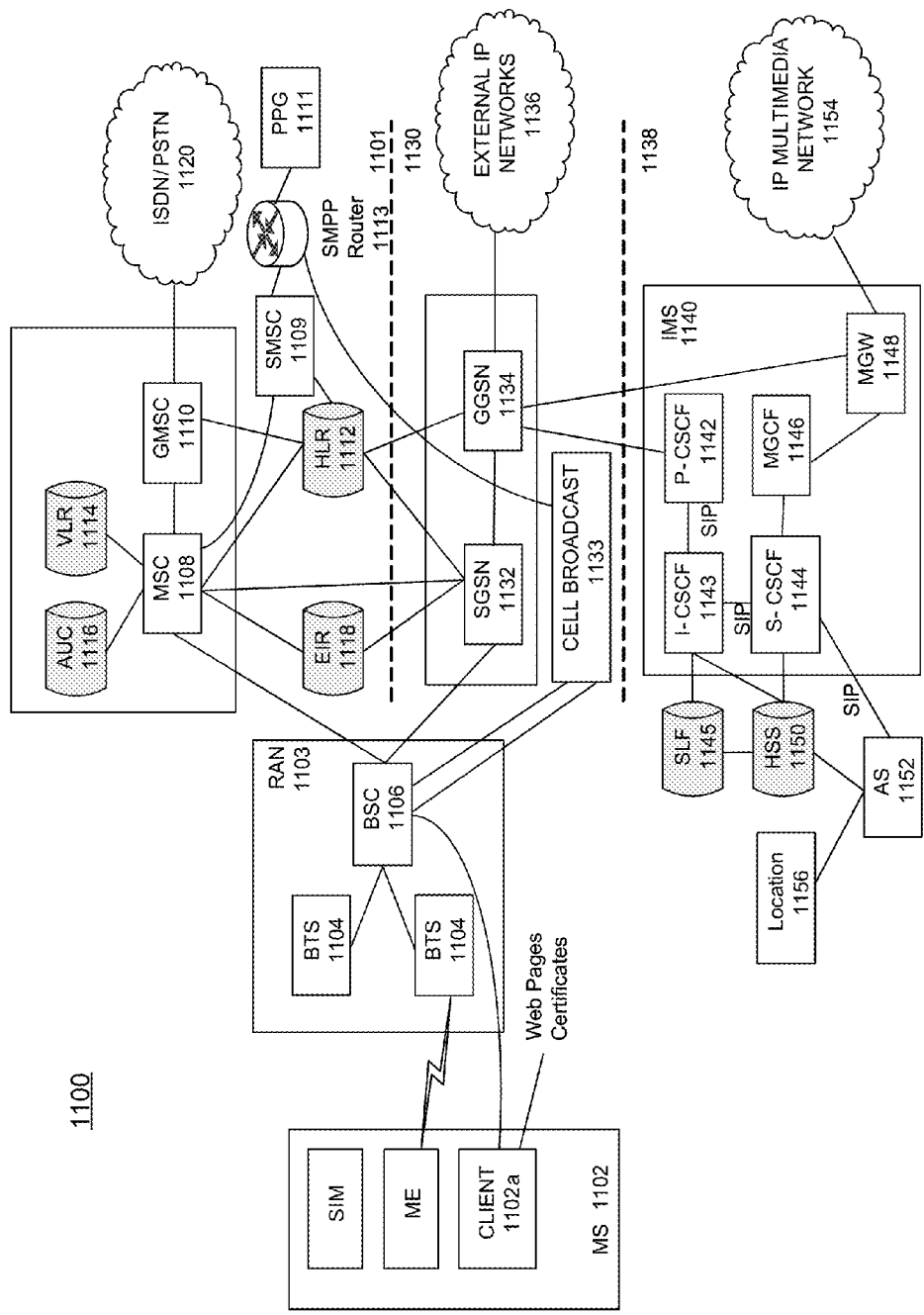
FIG. 13 illustrates a non-limiting alternate block diagram of an exemplary GSM/GPRS/IP multimedia network architecture in which dynamic bearer management may be implemented.

FIG. 13 illustrates another exemplary block diagram view of a GSM/GPRS/IP multimedia network architecture 1100 in which the systems and methods for dynamic bearer management such as those described herein may be incorporated. As illustrated, architecture 1100 of FIG. 13 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., mobile devices 210, 220, 410, 420, 610, and/or 620) that is used by mobile subscribers, in one embodiment with a Subscriber identity Module (SIM). The SIM includes an International Mobile Subscriber Identity (IMSI), which is a unique identifier of a subscriber. The SIM may also include APNs. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 may be a database that may contain administrative information regarding each subscriber registered in a corresponding GSM network. Such information may include APNs and APN profiles. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct an MS where to listen for paging messages and how to signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS may be receiving data and may not be listening to a paging channel. In a NOM3 network, a MS may monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138. Examples of HSS 1150 may include HSSs 250, 450, and/or 650.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision may be based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the pre-defined area. This registration, however, does not indicate the actual physical location of the mobile telephones outside the pre-defined area.

While example embodiments of systems and methods for dynamic bearer management have been described in connection with various communications devices and computing devices/processors, the underlying concepts can be applied to any communications or computing device, processor, or system capable of implementing the dynamic bearer management systems and methods described. The various techniques described herein may be implemented in connection with hardware or software or, where appropriate, with a combination of both. Thus, the methods and apparatuses for dynamic bearer management, or certain aspects or portions thereof, can take the form of program code (i.e., instructions) embodied in tangible and/or non-transitory media, such as floppy diskettes, CD-ROMs, hard drives, or any other machine-readable storage medium, wherein, when the program code is loaded into and executed by a machine, such as a computer, the machine becomes an apparatus for dynamic bearer management. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

Methods and systems for dynamic bearer management may also be practiced via communications embodied in the form of program code that is transmitted over some transmission medium, such as over electrical wiring or cabling, through fiber optics, or via any other form of transmission, wherein, when the program code is received, loaded into, and executed by a machine, such as an EPROM, a gate array, a programmable logic device (PLD), a client computer, or the like, the machine becomes an apparatus for dynamic bearer management. When implemented on a general-purpose processor, the program code combines with the processor to provide a unique apparatus that operates to invoke the functionality of dynamic bearer management as described herein. Additionally, any storage techniques used in connection with a dynamic bearer management system may invariably be a combination of hardware and software.

While dynamic bearer management systems and methods have been described in connection with the various embodiments of the various figures, it is to be understood that other similar embodiments may be used or modifications and additions may be made to the described embodiments for performing the same function of dynamic bearer management without deviating therefrom. For example, one skilled in the art will recognize dynamic bearer management as described in the present application may apply to any environment, whether wired or wireless, and may be applied to any number of such devices connected via a communications network and interacting across the network. Therefore, dynamic bearer management should not be limited to any single embodiment, but rather should be construed in breadth and scope in accordance with the appended claims.

What is claimed is:

1. A method comprising:
   receiving a request for quality of service parameters;
   responsive to receiving the request for the quality of service parameters, determining, at a home subscriber server, a number of requests for quality of service parameters received at the home subscriber server from a mobility management entity;
   determining a number of bearer requests based on the received number of requests for quality of service parameters;
   comparing the number of bearer requests to a threshold; and
   based on the comparison, adjusting the quality of service parameters to generate adjusted quality of service parameters.

2. The method of claim 1, wherein determining the number of bearer requests is further based on a number of service requests received at the mobility management entity.

3. The method of claim 1, wherein comparing the number of bearer requests to the threshold comprises determining that the number of bearer requests is one of below the threshold, near the threshold, at the threshold, or above the threshold.

4. The method of claim 1, wherein:
   the number of bearer requests is determined to be below the threshold; and
   a value of at least one of the adjusted quality of service parameters is the same as a value of a corresponding quality of service parameter.

5. The method of claim 1, wherein:
   the number of bearer requests is determined to be above the threshold; and
   a value of at least one of the adjusted quality of service parameters is less than half of a value of a corresponding quality of service parameter.

6. The method of claim 1, wherein:
the number of bearer requests is determined to be near the threshold; and
a value of at least one of the adjusted quality of service parameters is more than half of, but less than the same as, a value of a corresponding quality of service parameter.

7. A network device comprising:
a processor; and
memory coupled to the processor, the memory comprising executable instructions that when executed by the processor cause the processor to effectuate operations comprising:
receiving a request for quality of service parameters;
responsive to receiving the request for the quality of service parameters, determining, at a home subscriber server, a number of requests for quality of service parameters received at the home subscriber server from a mobility management entity;
determining a number of bearer requests based on the received number of requests for quality of service parameters;
comparing the number of bearer requests to a threshold, and
based on the comparison, adjusting the quality of service parameters to generate adjusted quality of service parameters.

8. The network device of claim 7, wherein determining the number of bearer requests is further based on a number of service requests received at the mobility management entity.

9. The network device of claim 7, the operations further comprising:
receiving a percentage of bearer resources that have been requested from the mobility management entity; and
comparing the percentage of bearer resources that have been requested to the threshold.

10. The network device of claim 7, the operations further comprising:
receiving a number of bearer resources that have been requested from the mobility management entity,
determining a percentage of bearer resources that have been requested at the mobility management entity; and
comparing the percentage of bearer resources that have been requested at the mobility management entity to the threshold.

11. The network device of claim 7, the operations further comprising reducing a value of at least one of the quality of service parameters.

12. The network device of claim 7, the operations further comprising receiving a first number of bearer requests from a first mobility management entity and a second number of bearer requests from a second mobility management entity.

13. The network device of claim 12, the operations further comprising comparing the first number of bearer requests to a first threshold and the second number of bearer requests to a second threshold.

14. A computer-readable storage medium that is not a signal per se, the computer-readable medium comprising executable instructions that when executed by a processor cause the processor to effectuate operations comprising:
detecting a request for quality of service parameters;
responsive to detecting the request for the quality of service parameters, determining, at a home subscriber server, a number of requests for quality of service parameters received at the home subscriber server from a mobility management entity;
determining a number of bearer requests based on the received number of requests for quality of service parameters;
comparing the number of bearer requests to a threshold; and
based on the comparison, adjusting the quality of service parameters to generate adjusted quality of service parameters.

15. The computer-readable storage medium of claim 14, the operation further comprising storing an indication that the request for the quality of service parameters.

16. The computer-readable storage medium of claim 15, the operations further comprising determining a number of requests for quality of service parameters that have been received.

17. The computer-readable storage medium of claim 16, the operations further comprising determining a percentage of bearer resources that have been requested.

18. The computer-readable storage medium of claim 17, the operations further comprising comparing the percentage of bearer resources that have been requested to the threshold.

19. The computer-readable storage medium of claim 14, wherein the processor resides on a home subscriber server.

* * * * *